J. DAVIES.
Hose-Coupling.
No. 210,923.   Patented Dec. 17, 1878.
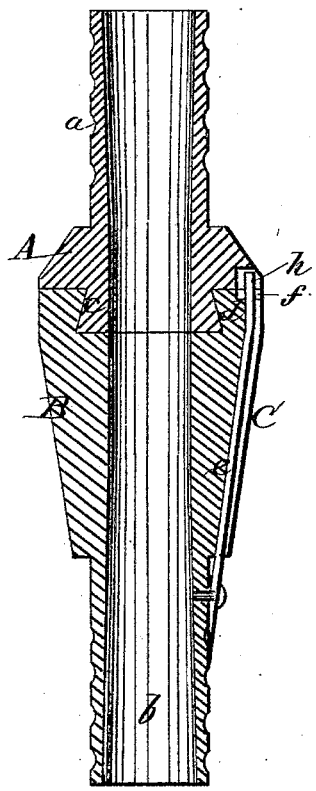
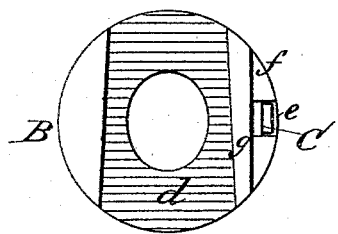 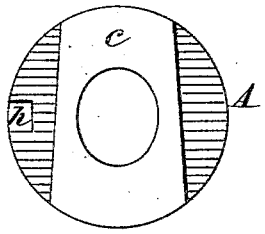
WITNESSES:
Achilles Schehl.
C. Sedgwick
INVENTOR:
J Davies
BY  Munn &Co
ATTORNEYS.

UNITED STATES PATENT OFFICE.

JOSHUA DAVIES, OF MUSKEGON, MICHIGAN.

IMPROVEMENT IN HOSE-COUPLINGS.

Specification forming part of Letters Patent No. 210,923, dated December 17, 1878; application filed November 5, 1878.

*To all whom it may concern:*

Be it known that I, JOSHUA DAVIES, of Muskegon, in the county of Muskegon and State of Michigan, have invented a new and Improved Hose-Coupling, of which the following is a specification:

The object of this invention is to provide a simple, secure, and easily-applied coupling for the metal joints of hose.

It consists in making a dovetail-connection between the two parts and fastening them together by means of a flat spring working in a socket.

In the accompanying drawings, Figure 1 is a longitudinal section of my improvements. Figs. 2 and 3 are plans of the two parts of the coupling.

Similar letters of reference indicate corresponding parts.

Referring to the drawing, A represents one of the metal connections provided with a projecting piece, $a$, to which one section of the hose is attached. B is the other metal connection, being a long frustum of a cone likewise provided with a projecting piece, $b$, for attaching the next section of the hose.

On the face of piece A is a dovetail projection, $c$, with converging sides, and on the face of piece B is a dovetailed slot, $d$, whose sides converge at the same angle as those of the projection $c$.

The side of metal connection B is provided with a longitudinal slot, $e$, forming a slot for the spring C, the lower end whereof is fastened by a screw to the socket $b$, just below its junction with piece B. The upper end of the spring is bent slightly to conform to the shape of the connection B at this point.

On the face of piece B, adjacent to the projecting end of the spring, is a rabbet, $f$, extending outward from the cord $g$.

A socket, $h$, is made in the periphery of piece A in such a place as to be immediately under the end of spring C and receive the same when the connections are joined together, as shown in Fig. 1. This spring locks the two parts together.

The operation of my improvement is as follows: The smaller end of the projection $c$ is entered into the larger end of the slot $d$ and pushed up until the sides of the slot and projection are in contact, when the peripheries of the two parts are flush with each other, and they are thus wedged together. When they reach this position the end of the spring enters the socket $h$, and thus locks the two parts together. When uncoupling, a wedge or lever of any kind is inserted in the rabbet $f$ under the end of spring, and by means of it the spring is lifted out of the socket $h$, when the two parts can be readily separated.

For ordinary purposes the spring-lock need not be employed, as the parts will remain together securely enough from the friction of the dovetailed connection; but for fire-hose the spring-lock will be necessary.

The face of the dovetailed projection and slot should be ground off, so that a water-tight joint will be made between them, as no packing is used.

The coupling is easily made, and the hose can be uncoupled as well under a full head of water as at any other time.

Having thus described my invention, I claim as new and desire to secure by Letters Patent—

1. As an improvement in hose-couplings, the dovetailed projection $c$, with converging sides on piece A, in combination with the dovetailed slot $d$, having converging sides on piece B to form a close, strong, and water-tight joint or union between the pieces A B and the sections of hose to which they are attached, substantially as described.

2. As an improvement in hose-couplings, the piece A, with projecting piece $a$, to connect with one section of hose, and provided with socket $h$ in its periphery, in combination with piece B, having projecting piece $b$, to connect with another section of hose, and provided with slot $e$, seating a spring, C, and rabbet $f$, the two pieces A B being united or joined by a dovetailed connection and locked by spring C engaging slot $h$, substantially as described.

JOSHUA DAVIES.

Witnesses:
A. A. PARKER,
R. W. DAVIS.